Nov. 7, 1961 J. WOTTON ET AL 3,007,304
VARIABLE AREA NOZZLE ORIFICES
Filed June 12, 1958 6 Sheets-Sheet 1
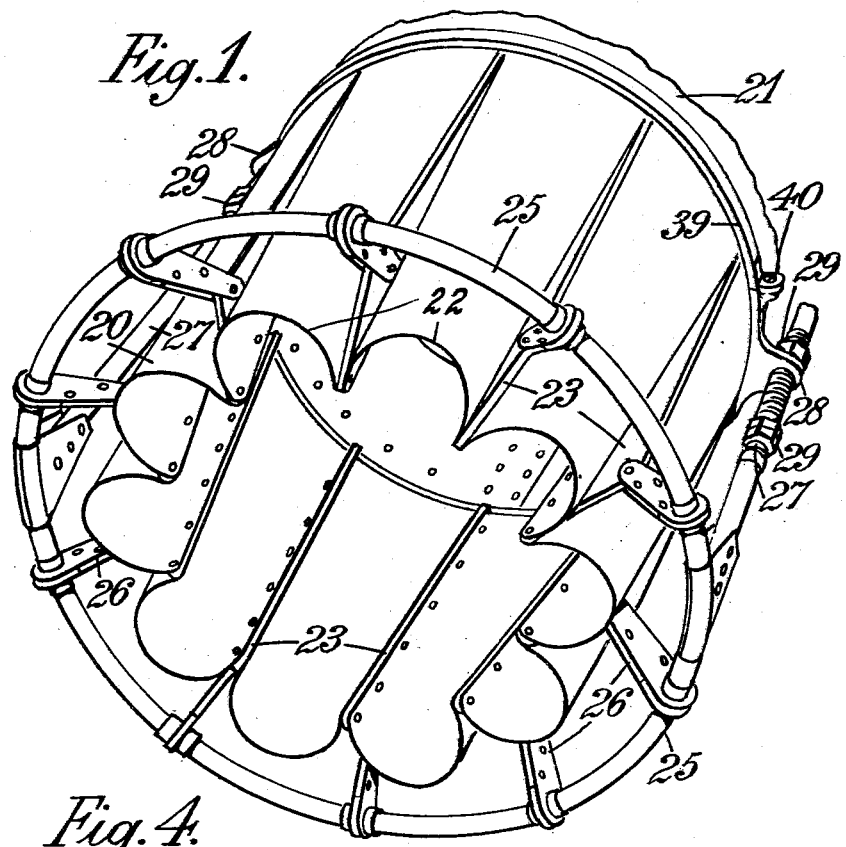
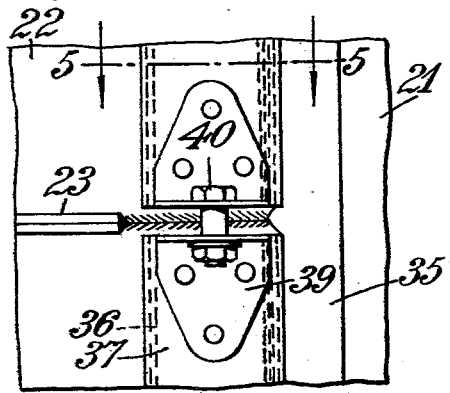
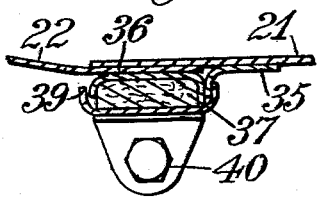
INVENTORS
JOHN WOTTON ET AL
ATTYS.

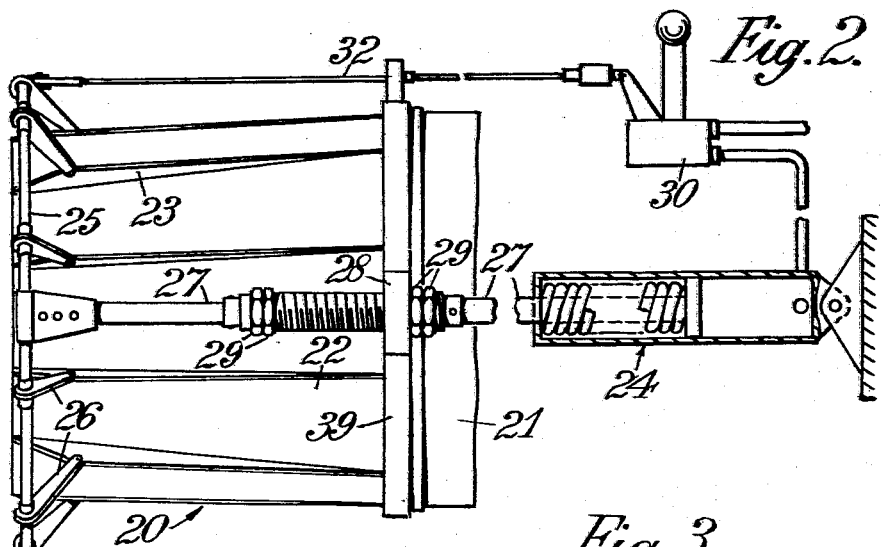
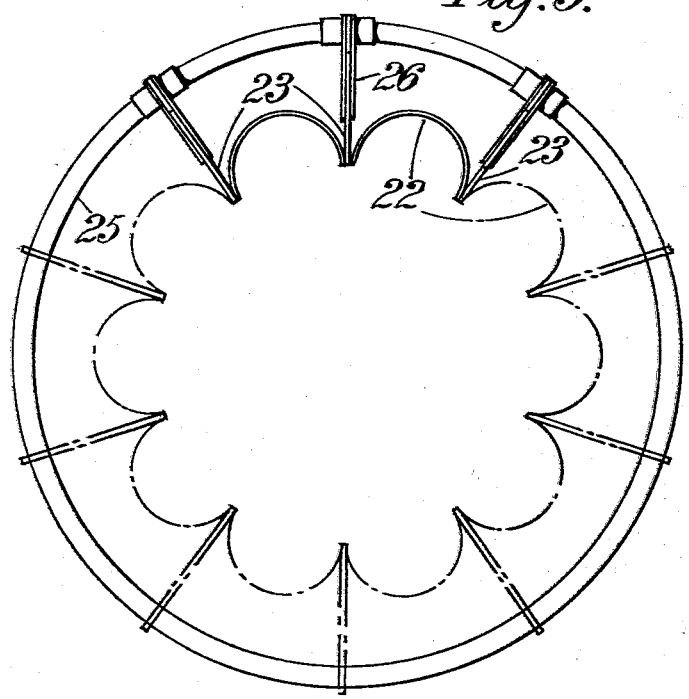

Nov. 7, 1961 J. WOTTON ET AL 3,007,304
VARIABLE AREA NOZZLE ORIFICES
Filed June 12, 1958 6 Sheets-Sheet 3
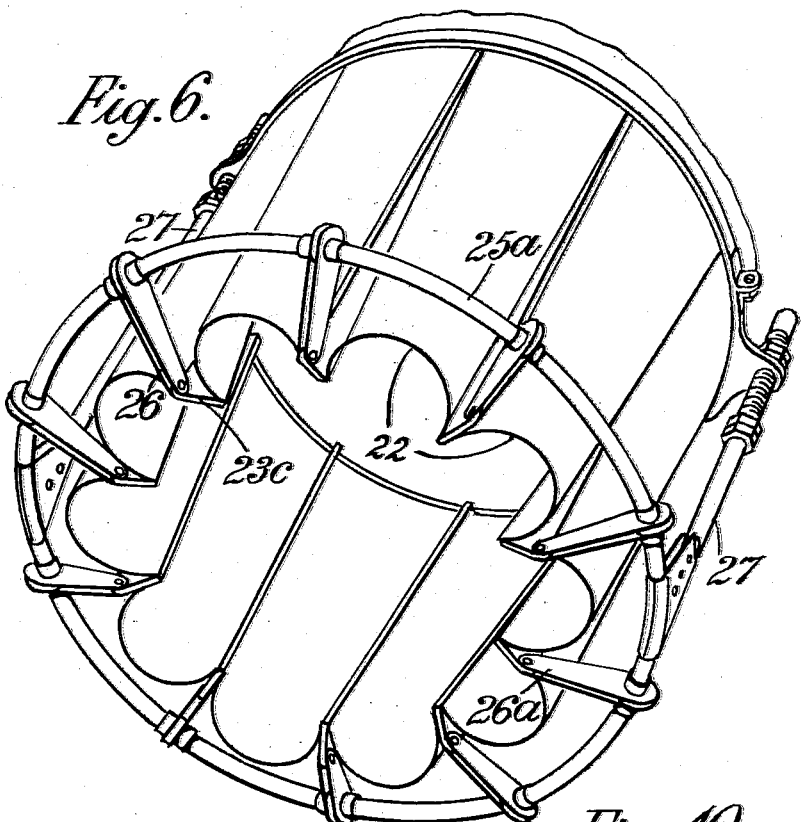
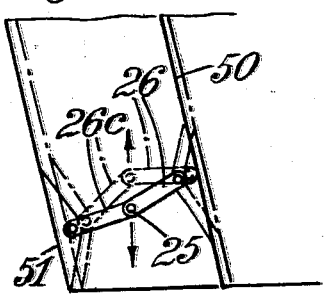
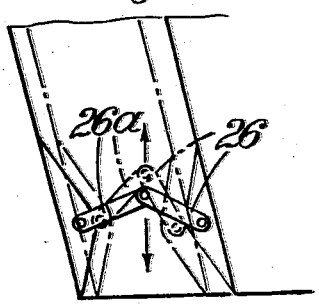
INVENTOR
JOHN WOTTON ET AL
mawhinney & mawhinney
ATTYS

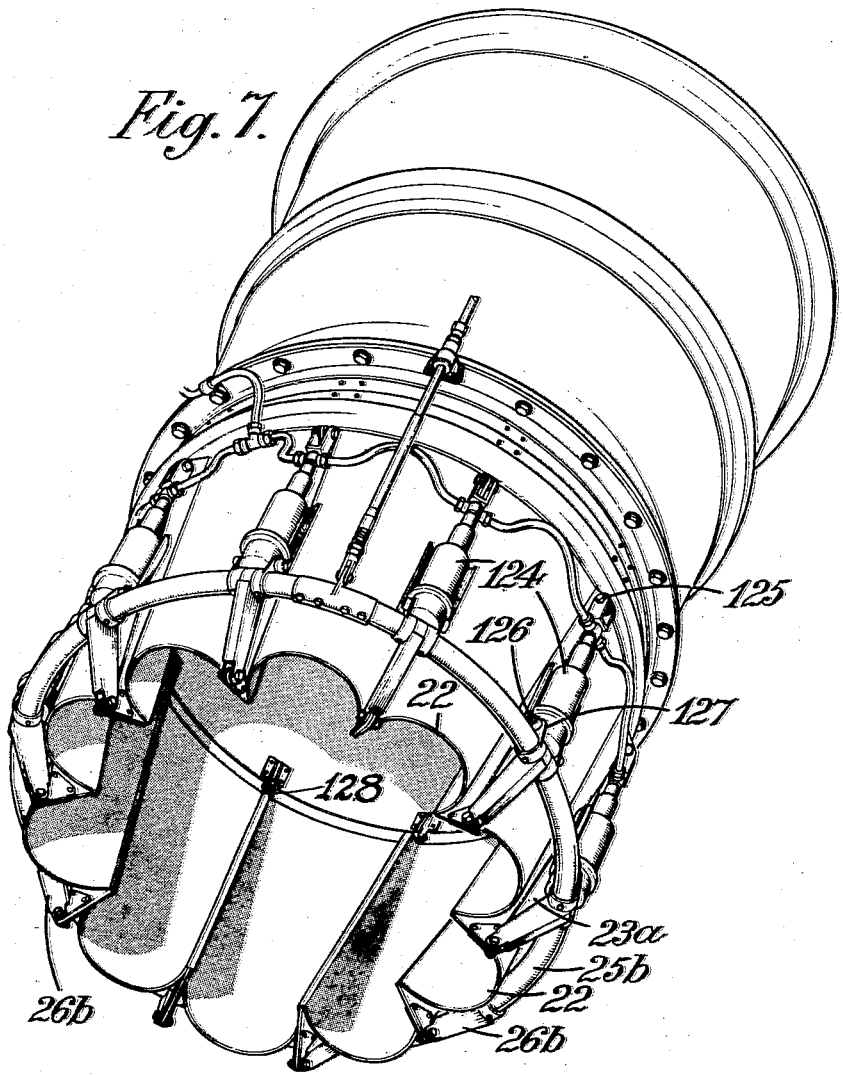

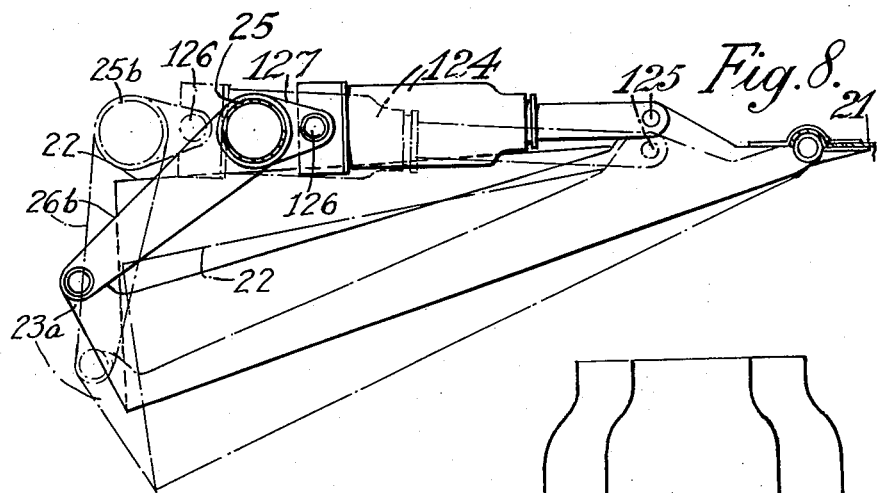
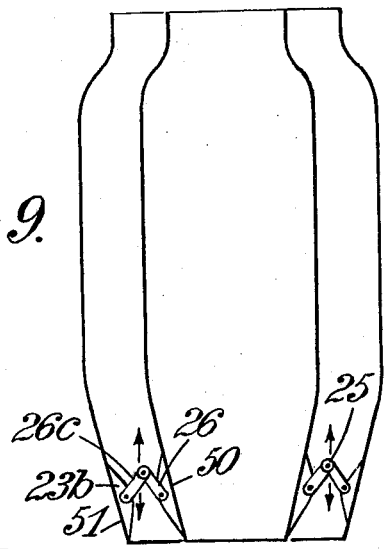
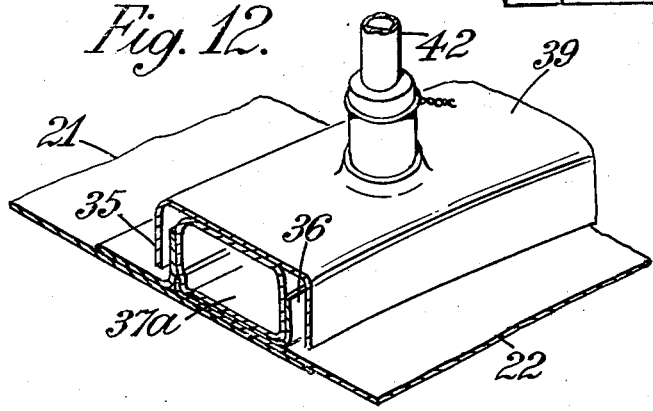

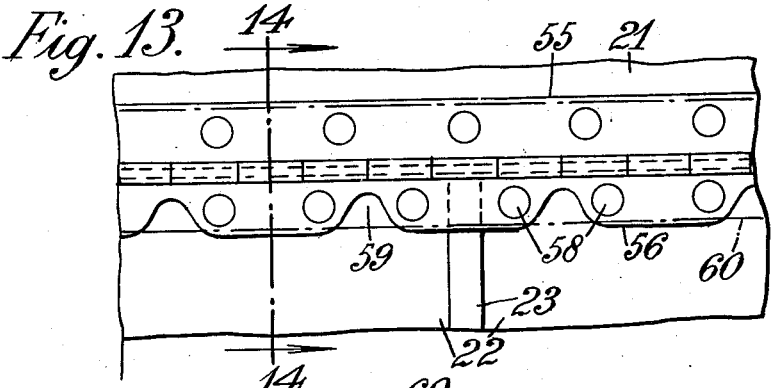
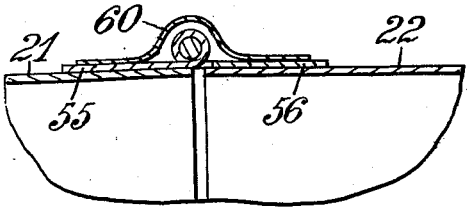
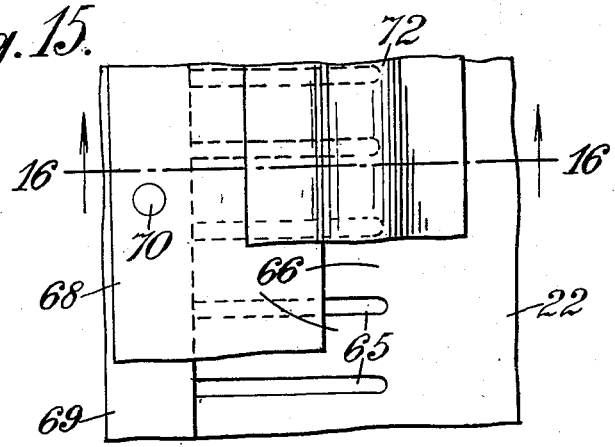
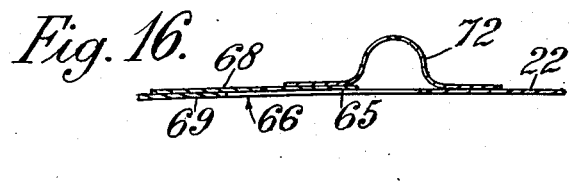

United States Patent Office 3,007,304
Patented Nov. 7, 1961

3,007,304
VARIABLE AREA NOZZLE ORIFICES
John Wotton and Clifford J. Webb, Bedfordshire, England, assignors to Hunting Aircraft Limited, Bedfordshire, England, a company of Great Britain
Filed June 12, 1958, Ser. No. 741,516
Claims priority, application Great Britain June 12, 1957
8 Claims. (Cl. 60—35.6)

The invention relates to variable area nozzle orifices and is especially, but not exclusively, concerned with such orifices for use at moderate temperature as the jet nozzle of jet engines.

Various forms of variable area orifices have been proposed for use in jet engines at high temperatures (e.g. up to 1200° C.). These orifices have necessarily been of somewhat elaborate and heavy construction and there now has developed a need for a variable area orifice of simple construction which will, at least, operate at lower temperatures (e.g. up to 750°). This need, which it is one object of the invention to meet, arises from the technique of designing a jet engine to run at nearly constant speed and lower turbine inlet temperature over the most useful part of its operating range and to vary the thrust by alteration of the jet pipe velocity. This variation consists in enlarging the orifice size for reduced thrust and a jet temperature of about 500° C. and reducing the size for maximum power output with a temperature of about 750°.

According to the invention an adjustable area nozzle orifice has the wall at one end of the orifice at least, composed of a succession, in the circumferential direction, of elastic sections of outwardly convex form having a curvature which is greater than that of the overall configuration of the orifice and joined together edge to edge in the axial direction whereby the cross-sectional area of the nozzle orifice may be varied by flexure in the circumferential direction of the sections, the orifice also having means for effecting this flexure.

Preferably the sections at at least one position within their range of flexure have the form of arcs of circles, e.g. approximately semi-circles. They may be arranged to retain the form of circular arcs, varying in radius and the angle they subtend, over a part or the whole of the range and this arrangement is preferred. Alternatively the shape of the cross-sectional curve may vary during the range of flexure.

The means for effecting the flexure of the sections may be arranged to apply inward forces at the joints between adjacent sections. The means may, for example, comprise an annular member around the axis of the orifice, a series of toggle links between the member and the orifice sections and means for moving the member axially whereby the links apply, by a toggle action, radial forces to the sections.

Some specific constructions of nozzle orifices according to the invention will now be described by way of example and with reference to the accompanying drawings, in which:

FIGURE 1 is a perspective view of one construction of orifice,

FIGURE 2 is a side view of the orifice, showing part of the operating mechanism therefor, diagrammatically, FIGURE 3 is a view looking into the open end of the orifice, FIGURE 4 is a detail view showing the means for securing the nozzle orifice to a jet pipe in substantially gas-tight relation, FIGURE 5 is a section on the line 5—5 in FIGURE 4, FIGURE 6 is a view, similar to FIGURE 1, of a second construction of orifice, FIGURE 7 is a view, similar to FIGURE 1, of a third construction of orifice, FIGURE 8 is a longitudinal section through the top of the construction shown in FIGURE 7 and showing the operating means, the figure showing the orifice fully open and also, in chain lines, closed to the maximum extent, FIGURE 9 is a diagram showing, in section, two concentric orifices, FIGURES 10 and 11 are diagrams showing variations of the construction according to FIGURE 9, FIGURE 12 is a detail perspective view showing a part of a modification of the securing means shown in FIGURE 5, FIGURE 13 is a detail view showing another construction of securing means, FIGURE 14 is a section on the line 14—14 in FIGURE 13, FIGURE 15 is a detail view showing a further construction of securing means, and FIGURE 16 is a section on the line 16—16 in FIGURE 15.

The orifice 20 shown in FIGURES 1 to 5 is attached, by the joint later described, to the outlet end of the jet pipe 21 of a jet engine operating at constant speed, as above mentioned. The orifice is substantially circular at the end which is secured to the pipe and it tapers inwardly towards the other, outlet, end which is open.

The orifice is constructed of sections 22, in this example there are ten, each of resilient sheet metal. Each section is of approximately semi-circular form at the open end and at one setting of the orifice as seen in FIGURE 3, and gradually changes shape along its length to the other end where it has an arcuate form to fit the jet pipe.

The open end of the orifice is of scalloped form and may be regarded as a circle having superimposed on it a series of approximate semi-circles outwardly convex. Such a formation is particularly well adapted to resist changing internal pressures and has a large measure of stability which it retains when the radius of curvature of the sections is changed.

Secured between each pair of sections 22 (e.g. by welding or rivetting thereto) there is a gusset plate 23 which extends along the whole length of the orifice.

Surrounding the small, open end, of the orifice, there is a rigid ring 25 somewhat larger in diameter than the orifice. This ring is connected by links 26 to the several gussets, the links extending in a direction inwardly of the ring with an axial component towards the larger end of the orifice so that bodily axial movement of the ring towards that end causes the links, by a toggle action, to apply inward pressure to the gussets and so to contract the open end of the orifice.

Means for effecting such axial movements of the ring are provided. These means comprise, at each side of the orifice, a hydraulic ram 24 which is connected to a rod 27 rigidly attached to the ring 25. Each rod passes, with clearance, through a guideway 28 at the end of the jet pipe and the movements of the rod are adjustably limited by stop nuts 29.

The admission of hydraulic fluid to the two rams 24 is controlled by an infinitely variable valve 30 of the well known kind having a follow-up device which operates to close the valve when the ring 25 has reached a position corresponding to the setting of an adjustable valve member. This follow-up device is operated mechanically by a cable 32 from the ring 25.

The joint aforesaid comprises an outward flange 35 secured around the jet pipe 21 a short distance from the end thereof. The larger end of the orifice fits around the end of the jet pipe nearly up to this flange and around this portion of the orifice there is secured, to the orifice, an annular channel 36 containing a substantial ring 37 of asbestos. Surrounding the whole there is a split ring 39 of channel form which is contracted by means of a bolt 40. The ring 39 embraces and compresses the asbestos ring and also secures the orifice against axial movement by engaging the flange 35 against one side of the channel 36. The resilience of the asbestos absorbs the flexing movements of the ends of the orifice sections due to the opening and closing movements of the open end thereof.

The construction shown in FIGURE 6 is similar to that just described but modified in the following respects. In this construction the toggle links 26a extend inwardly with an axial component towards the smaller, open end of the orifice where they are pivoted to the gussets 23a. This enables the ring 25a to be made somewhat smaller and to fit more closely around the orifice. The movements of the ring 25a to open and close the orifice are opposite to those in the first example.

It is an advantage of the above examples that the rigid connections of the ring 25, 25a to the operating rods 27 provide a rigid construction which ensures that the two rods 27 will move equally.

In the construction shown in FIGURES 7 and 8 a modified form of operating means is employed, these means being suitable for use where the operating forces required are substantial. In this construction there is, between each pair of adjacent sections 22, a gusset 23a as in the preceding example, and around the orifice there is a ring 25b with toggle link connections 26b to the gussets as in the construction of FIGURE 6. The rams 24 are, in this example, replaced by hydraulic or pneumatic rams 124 of which there is one for each gusset. These rams act between pivotal attachments 125 to the gussets and pivotal attachments 126 to plates 127 fixed to tube 25b. The gusset plates 23a are individually hinged, as seen at 128, to the jet pipe 21, the hinge axes being tangential to the pipe. There is a considerable advantage in this arrangement of the rams to act between the gusset plates and the floating ring. In this arrangement the thrust of the rams does not have to be transmitted through the attachment of the nozzle to the jet pipe as in other constructions.

A nozzle orifice constructed as above described in any of the examples may have the area variable by 33% or more.

The scalloped formation of the orifice assists in silencing.

It is also an important feature of the construction of nozzle orifice that when it is located within a shroud or cowling directing cooling air over the outside of the orifice, the operating mechanism will lie in the cooling air stream and isolated from the hot nozzle except for the connecting links. Furthermore the simple construction of orifice and operating mechanism offers a minimum of obstruction to the cooling air.

It is a further important feature of the constructions described that the operating mechanism comprising the ring 25, 25a or 25b and the toggle links is stable and requires no other support than the link connections to the nozzle sections.

An advantage of each of the above constructions is that the orifice itself is formed without relatively moving parts and the operating mechanism is of extremely simple construction.

The nozzles according to the invention may also be used for by-pass engines having two concentric jets. Thus a variable nozzle as above described may be used for either the inner or the outer jet or both. FIGURES 9–11 illustrate, diagrammatically, the use of the nozzles for both jets. In FIGURE 9 there are two nozzle orifices 50, 51, the inner orifice 50 being constructed as in the first example. The outer orifice, 51, is also as in the first example but is modified in that the gussets 23b and toggle links 26c are on the inside of the orifice. Axial movements of the ring 25 will effect simultaneous opening and closing movements of the two orifices, the one opening while the other closes. By varying the relative angles of the links 26 and 26c as shown in FIGURE 10 the movements of the two orifices may be made unequal. FIGURE 11 shows how movements of the orifices in the same sense may be obtained.

FIGURE 12 shows a modified form of the joint shown in FIGURE 5. In this modification the asbestos ring 37 is replaced by an asbestos fabric tube 37a which, in use, is maintained under internal gas pressure through a pipe connection 42.

FIGURES 13 and 14 show another construction of joint between the variable area nozzle orifice and a jet pipe and means for sealing the joint. In this construction the sections 22 of the nozzle orifice are attached to the end of the jet pipe 21 by a continuous hinge 55, 56 bent to, approximately, circular form. The hinge part 55 is secured by rivets 57 to the jet pipe and the hinge part 56 is riveted to the sections 22 as seen at 58. The part 56 is provided with notches 59 giving flexibility to this part. This flexibility, in conjunction with some measure of looseness in the hinge joints and the fact that the angular hinging movement of the sections 22 is extremely small enables the circular hinge to be effective for its purpose. To effect a gas-tight seal there is provided over the hinge joint a stainless steel annulus 60 as seen in FIGURE 16. The flanges of this annulus are spot-welded to the hinge parts 55, 56. The annulus is constructed of thin flexible material and has sufficient flexibility to permit the slight hinging movement of the sections 22.

Yet another construction of joint and sealing means is shown in FIGURES 15 and 16. In this construction the ends of the section 22 of the orifice are slotted as seen at 65 to form a series of flexible tongues 66. The end portions of these tongues are spot-welded inside an annulus 68 of heat resisting strip material, the width of the annulus 68 extending beyond the ends of the tongues. Within this extending portion of the annulus there is welded a second annulus 69 having a thickness which is the same as that of the tongues 66. The annulus 69 accordingly serves to close the mouths of the slots 65. To attach the orifice to the jet pipe, the annulus 69 is fitted over the end of the pipe and the orifice is secured by screws through holes 70. The root portions of the tongues 66 provide the flexibility required for the hinging movements of the sections 22 in opening and closing the orifice. To effect a sealing closure of the slots 65 there is provided a flexible annulus 72, similar to annulus 60 above, and welded along its flanges to these sections and to the annulus 68. The ends of the gusset plates 23, where they underlie the annuli 68 and 72, are cut to conform to the circumference of the sections and to fit within the annuli.

The invention is not restricted to the constructional details of the above examples. For instance the return movements of the rams may be effected hydraulically, pneumatically or electrically instead of by the springs as shown in FIGURE 2. Again the rams as disclosed may be replaced by screw jacks operated, for example, by motors driven by air, liquid or electrically. It is desirable that when rams which operate in one direction are used and the return movements are effected by springs or the like, the arrangement shall be such that in the event of a failure in the power supply or follow-up mechanism, the springs will be effective to adjust the nozzle to a safe position. In the construction shown in FIGURE 2 the springs tend to reduce the orifice area and this is the arrangement suited for a "normal to cold" application and for a constant speed engine as described above. If, as is within the invention, after-burning or re-heat is used, it may be desirable to reverse the arrangement so that the springs tend to enlarge the orifice area.

We claim:

1. In an assembly of a jet pipe of circular section and an adjustable area nozzle orifice forming an extension of the jet pipe and coaxial therewith, a construction of the nozzle orifice which has a wall defining the nozzle outlet, said wall comprised substantially entirely of a succession, in the circumferential direction, of elastic sections of which each is of outwardly convex form and at the upstream end has a circular curvature to conform with that of the jet pipe and is of increasing curvature towards the other, downstream, end where the curvature is greater than that of the overall configuration of the outlet, means for flexibly securing the upstream ends of the elastic sections to the jet pipe, means for joining each elastic section to its adjacent elastic section comprising a radial gusset plate extending lengthwise away from the jet pipe one between each pair of adjacent elastic sections and secured to each elastic section of each pair of elastic sections, and means for effecting simultaneous radial swinging movements of the downstream ends of the gusset plates remote from the jet pipe whereby the cross section of the nozzle outlet may be varied by flexure in the circumferential direction of the sections progressively from the jet pipe to the said downstream ends of the sections.

2. A nozzle orifice in combination with a jet pipe as claimed in claim 1 in which said flexible means comprises a plurality of flexible tongues in the upstream ends of the elastic sections.

3. A nozzle orifice in combination with a jet pipe as claimed in claim 2 in which the tongues are formed between lengthwise open-ended slots cut in the sections and a flexible annulus is provided over at least parts of the slots to form a seal therefor.

4. A nozzle orifice in combination with a jet pipe as claimed in claim 3 and including an annulus abutting the inlet ends of the sections to close the open ends of the slots.

5. A nozzle orifice in combination with a jet pipe as claimed in claim 1 and incorporating hinge means by which the gusset plates are individually hinged to the jet pipe about axes tangential to the jet pipe.

6. A nozzle orifice in combination with a jet pipe as claimed in claim 1 in which the means for effecting simultaneous swinging movements of the gusset plates comprise an annular member around the axis of the orifice, a series of toggle links connected between the annular member and the gusset plates and means for moving the annular member axially to cause the links to apply, by a toggle action, radial forces to the gusset plates to flex the sections.

7. A nozzle orifice in combination with a jet pipe as claimed in claim 6 in which the means for moving the annular member axially comprise rams connected for action between the member and the gusset plates.

8. A nozzle orifice in combination with a jet pipe as claimed in claim 6 in which the means for effecting axial movement of the annular member comprise at least one ram operating on the member, a follow-up control therefor and a mechanical connection between the member and the control for effecting the follow-up thereof.

References Cited in the file of this patent

UNITED STATES PATENTS

| | | |
|---|---|---|
| 2,634,578 | Kallal | Apr. 14, 1953 |
| 2,683,348 | Petry | July 13, 1954 |
| 2,693,078 | Laucher | Nov. 2, 1954 |
| 2,828,602 | Gardiner | Apr. 1, 1958 |
| 2,865,165 | Kress | Dec. 23, 1958 |

FOREIGN PATENTS

| | | |
|---|---|---|
| 700,754 | Great Britain | Dec. 8, 1953 |